United States Patent
Eichelberger et al.

(10) Patent No.: US 12,202,050 B2
(45) Date of Patent: Jan. 21, 2025

(54) TURNING TOOLHOLDER WITH ENHANCED COOLANT DELIVERY SYSTEM

(71) Applicant: Kennametal Inc., Latrobe, PA (US)

(72) Inventors: Samuel Eichelberger, Trafford, PA (US); Igor Kaufmann, Nuremberg (DE); Dominik Schmid, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 218 days.

(21) Appl. No.: 17/564,438

(22) Filed: Dec. 29, 2021

(65) Prior Publication Data
US 2023/0201929 A1   Jun. 29, 2023

(51) Int. Cl.
  *B23B 27/00* (2006.01)
  *B23B 27/10* (2006.01)
  *B23B 27/16* (2006.01)

(52) U.S. Cl.
  CPC .......... *B23B 27/10* (2013.01); *B23B 27/1666* (2013.01); *B23B 2250/12* (2013.01); *B23B 2270/08* (2013.01)

(58) Field of Classification Search
  CPC ..... B23B 27/10; B23B 27/16; B23B 27/1677; B23B 27/1644; B23B 27/1651; B23B 27/1648; B23B 27/1625; B23B 27/1659; B23B 2260/03; B23B 2205/045; B23B 2205/04; B23B 2250/12; B23B 2231/24; B23C 5/28; B23C 5/282; B23C 5/285; B23Q 11/10
  See application file for complete search history.

(56) References Cited

U.S. PATENT DOCUMENTS 4,621,547 A * 11/1986 Yankoff ................ B23B 27/167
  407/11
6,045,300 A *  4/2000 Antoun .................. B23B 27/10
  407/11

(Continued)

FOREIGN PATENT DOCUMENTS

CN    207239183 U       4/2018
EP    0791420 A1 *      8/1997
(Continued)

OTHER PUBLICATIONS

JP-2018012171-A Machine Translation (Year: 2024).*
JP-2009113185-A Machine Translation (Year: 2024).*

*Primary Examiner* — Nicole N Ramos
(74) *Attorney, Agent, or Firm* — Christopher J. Owens

(57) ABSTRACT

A turning toolholder includes a shank, a club head, and a clamp and a clamp screw for clamping a cutting insert. The club head includes a clamp coolant supply hole in fluid communication, a flank coolant supply hole and an auxiliary rake coolant supply hole, all in fluid communication with the main coolant supply hole. Coolant is supplied through a rake coolant exit opening formed in the forward nose portion of the clamp to direct coolant to the top rake surface of the cutting insert, and coolant is supplied through a flank coolant exit opening located below the insert-receiving pocket to provide coolant to the side flank surfaces of the cutting insert. In addition, an auxiliary rake coolant supply housing formed on a top surface of the club head supplies additional coolant to the top rake surface of the cutting insert during high heat applications.

16 Claims, 15 Drawing Sheets

(56) References Cited

U.S. PATENT DOCUMENTS

| | | | |
|---|---|---|---|
| 8,388,268 B2* | 3/2013 | Henry | B23B 27/10 407/101 |
| 10,029,313 B2* | 7/2018 | Kaufmann | B33Y 80/00 |
| 10,596,634 B2 | 3/2020 | Forsberg et al. | |
| 11,344,953 B2* | 5/2022 | Hirano | B23B 27/10 |
| 11,583,934 B2* | 2/2023 | Larsson | B33Y 80/00 |
| 2002/0122698 A1* | 9/2002 | Lagerberg | B23B 27/10 82/1.11 |
| 2006/0140728 A1* | 6/2006 | Giannetti | B23B 27/10 407/11 |
| 2007/0283794 A1 | 12/2007 | Giannetti | |
| 2007/0286689 A1 | 12/2007 | Giannetti | |
| 2009/0022553 A1 | 1/2009 | Morrison et al. | |
| 2016/0067786 A1* | 3/2016 | Thelin | B23B 27/007 407/11 |
| 2018/0161885 A1 | 6/2018 | Forsberg et al. | |
| 2018/0369923 A1 | 12/2018 | Chen et al. | |
| 2019/0001454 A1 | 1/2019 | Huang | |
| 2019/0030612 A1 | 1/2019 | Larsson et al. | |
| 2019/0160549 A1 | 5/2019 | Amstibovitsky et al. | |
| 2019/0366444 A1 | 12/2019 | Henzler et al. | |
| 2020/0230710 A1 | 7/2020 | Hirano et al. | |

FOREIGN PATENT DOCUMENTS

| | | | | |
|---|---|---|---|---|
| EP | 2353779 A1 | | 8/2011 | |
| EP | 2178667 | | 8/2017 | |
| EP | 3219421 A1 | | 9/2017 | |
| JP | 06285703 A | * | 10/1994 | |
| JP | 2006055916 A | * | 3/2006 | |
| JP | 2009113185 A | * | 5/2009 | |
| JP | 2018012171 A | * | 1/2018 | B23B 27/10 |
| KR | 20140086045 A | * | 7/2014 | |

* cited by examiner

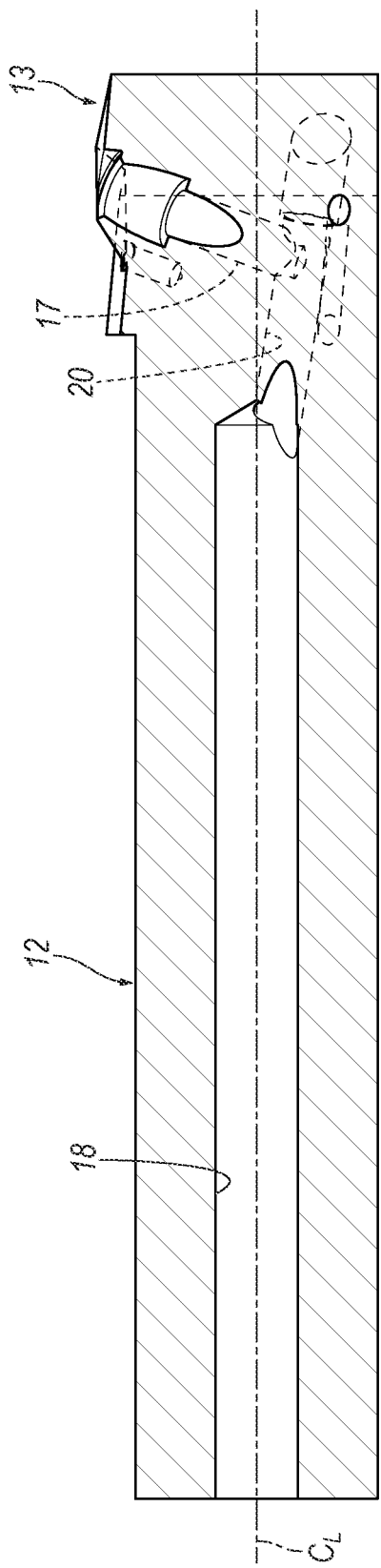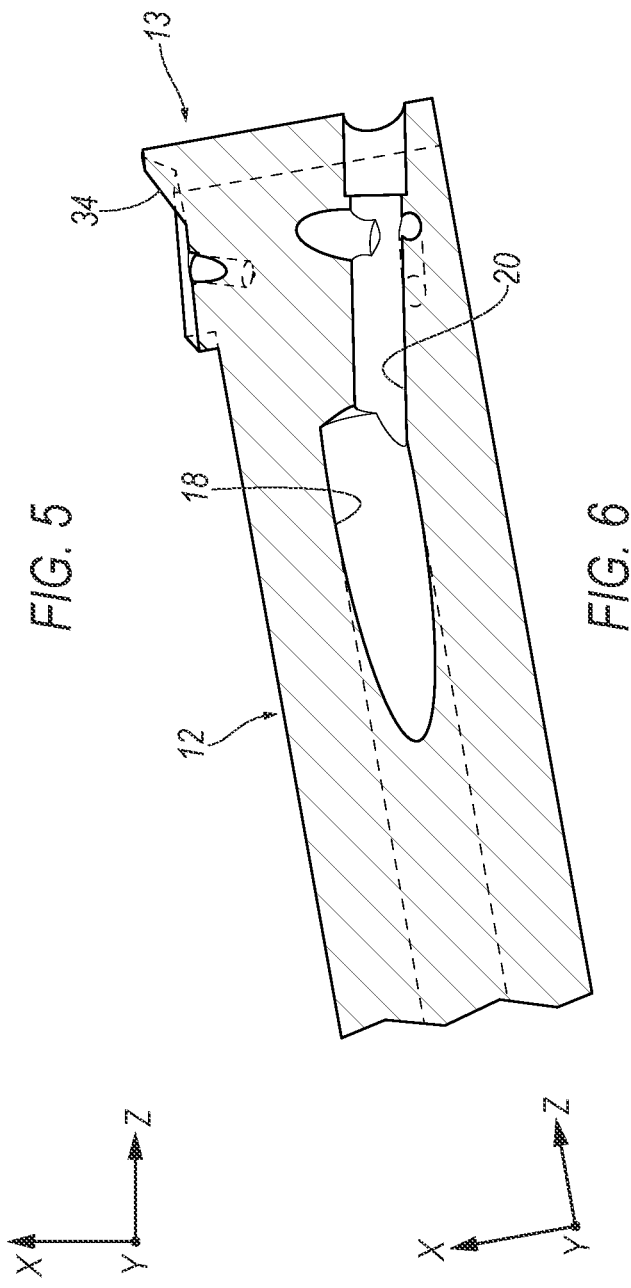
FIG. 5
FIG. 6

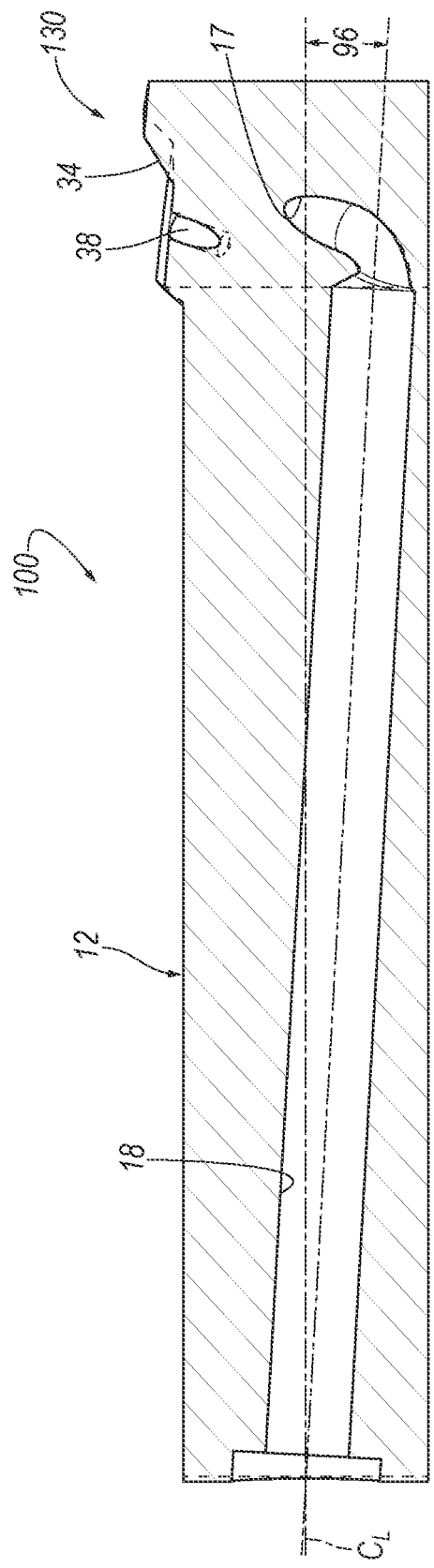
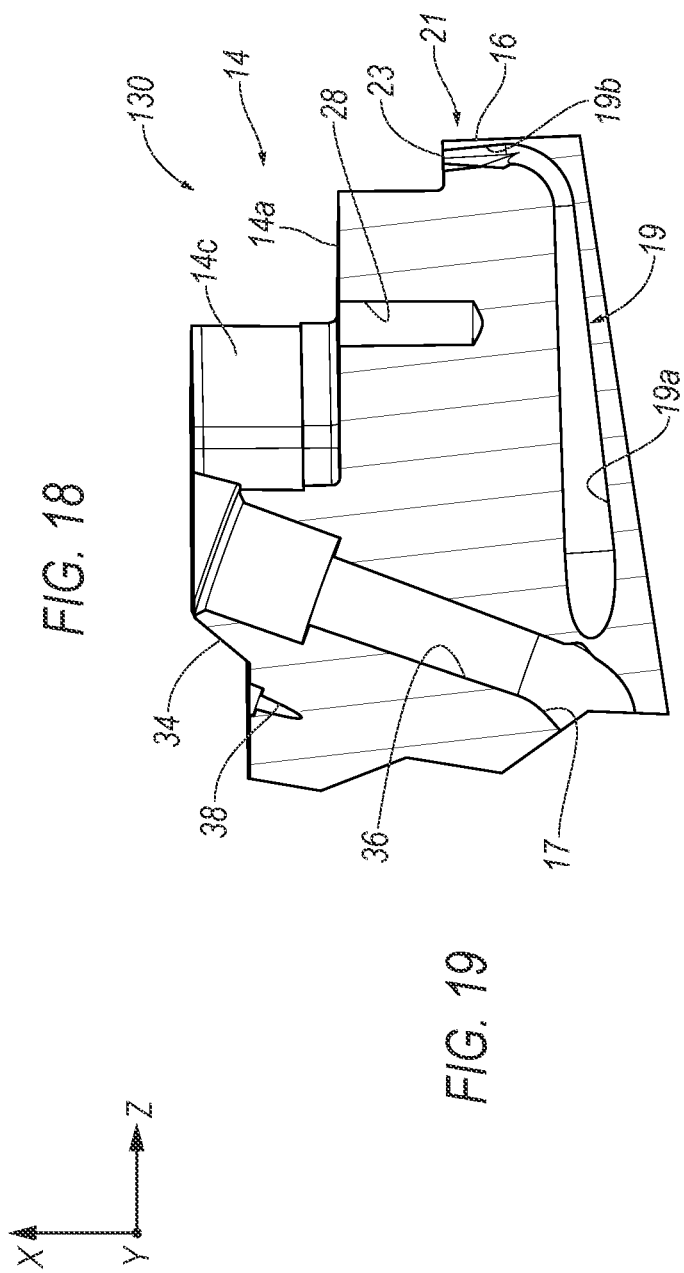
FIG. 18
FIG. 19 ced heat. Coolant is supplied in very close proximity to the cutting zone to minimize coolant fanning and velocity losses to increase chip breaking capabilities.

TURNING TOOLHOLDER WITH ENHANCED COOLANT DELIVERY SYSTEM

FIELD OF THE DISCLOSURE

The disclosure pertains to a turning toolholder. More particularly, the disclosure relates to a turning toolholder with an enhanced coolant delivery system that delivers coolant to the cutting zone comprising the top rake surface and the side flank surfaces of the cutting insert, thereby providing enhanced cooling of the cutting zone and superior chip breaking capability during a machining operation.

BACKGROUND OF THE DISCLOSURE

Machining of high temp alloys presents challenges in tool wear and chip breaking. Most of the heat generated in the metal cutting operation is put back into the cutting tool which causes premature wear. Finishing operations can pose additional challenges, such as the inability to break chips, which can lead to birds nesting and poor surface finishes. Rigid insert clamping mechanisms can lead to further challenges by creating less space for chip evacuation and providing additional opportunities for chip jamming.

In view of the foregoing, it is desirable to provide a toolholder capable of supplying coolant through the body and in close proximity to the heat affected areas or cutting zone of the cutting insert to increase tool life, improve chip breaking capabilities, and therefore improve surface finish of the workpiece.

SUMMARY OF THE DISCLOSURE

The problem of providing coolant through the body and in close proximity to the heat affected areas of the cutting insert to increase chip breaking capabilities is solved by providing a toolholder that delivers coolant in close proximity to the cutting edge through intersecting holes within the shank. The shank is plumbed to the machine tool by means of flexible hoses and fittings where coolant can be supplied at low and high pressure. Coolant is strategically routed to the insert clamp assembly where the coolant is directed through an internal conduit of the clamp screw, into the clamp, and then carefully directed to the cutting zone of the insert to dissipate heat. Coolant is supplied in very close proximity to the cutting zone to minimize coolant fanning and velocity losses to increase chip breaking capabilities.

Coolant is further supplied to an exit location below the insert pocket and is directed to the flank of the cutting insert. A flank coolant channel is a separate branch that intersects the main coolant supply channel at the junction of the club head and the shank. The flank supply hole gradually decreases in diameter from the intersection location with the main coolant supply hole to the exit location to increase coolant velocity. The exit fans into an V-shape with a similar included angle to that of the cutting edges of the insert. This additional coolant supply helps further cool the insert and provides lubrication to reduce flank wear.

In one embodiment, an additional coolant exit supplies coolant through an extrusion at the top of the club head, across the insert rake, and directed to the cutting zone of the insert. This additional coolant supply is a separate branch that intersects the main coolant supply hole at the junction of the club head and the shank. The additional coolant exit supplies higher cooling capabilities by doubling the coolant volume the holder is capable of flowing and doubling the coolant volume that is supplied to the cutting zone of the insert. Lastly, chip evacuation and breaking capabilities are advanced by the additional coolant supply.

The insert clamping mechanism is comprised of a clamping body with a low profile, narrow shape that extends over and covers the through hole of the insert. This profile provides more room for chip evacuation and reduces chip jamming by eliminating areas in which chips can collect.

The club head is designed with a large radius for added clearance on the opposite side of the cutting insert. The large radius allows access to tighter work piece geometries and provides more clearance for chip evacuation.

The clamp may include a circumferential channel to evenly distribute coolant exiting the exiting the internal conduit of the clamp screw. In addition, a plurality of broad openings may help to create a laminar and focused flow on the cutting edge of the insert.

In one embodiment, the toolholder enables an improved coolant flow connection between the turn holder and the clamp. In conventional designs, the coolant is transferred either through a hole in the screw or a dedicated connection. While the dedicated connection is described in other patents and requires extra effort during manufacturing, the connection though the screw bore is narrow and tends to lead to pressure drops due to sharp edges.

In one embodiment, the coolant channel is formed outside the clamp screw, instead of the internal conduit in the clamp screw, which enables a much larger channel cross section and a smoother transition of the flow. Therefore, the flow and pressure of the coolant exiting the clamp is increased and the cutting conditions are improved.

The principles of the invention can be applied to a toolholder with a conventionally manufactured club head, or a hybrid toolholder in which the club head is manufactured using additive manufacturing (i.e., 3D printing). In the hybrid design, it is possible to place the screw in an eccentrical and/or nonparallel position with respect to the channel wall to maximize usable space and to improve the clamping conditions.

In one aspect of the invention, a turning toolholder comprises a shank having a main coolant supply hole extending therethrough and a club head at an axially forward end of the shank. The club head has an insert-receiving pocket for receiving a cutting insert. The cutting insert has a top rake surface and one or more side flank surfaces. The club head includes a clamp coolant supply hole in fluid communication with the main coolant supply hole and a flank coolant supply hole in fluid communication with the main coolant supply hole. The club head further includes a flank coolant housing with a flank coolant exit opening located below the insert-receiving pocket. A clamp is arranged on the club head. The clamp includes a forward nose portion with a downward-extending nub and an aperture formed therethrough. The clamp includes a rake coolant supply hole extending from the aperture to a rake coolant exit opening in the forward nose portion of the clamp. A clamp screw is capable of being inserted through the aperture of the clamp and at least partially received in a clamp-securing bore of the club head to bring the clamp into pressing engagement with the cutting insert. The clamp screw includes an internal coolant supply hole for supplying coolant from the main coolant supply hole to the rake coolant supply hole of the clamp Coolant is supplied from the main coolant supply hole, through the internal coolant supply hole of the clamp screw, through the rake coolant supply hole of the clamp, and exits from the rake coolant exit opening in the forward nose portion of the clamp to direct coolant to the top rake surface of the cutting insert. In addition, coolant is supplied from the main coolant supply hole, through the flank coolant supply hole, and exits the flank coolant exit opening to direct coolant to the one or more side flank surfaces of the cutting insert.

In another aspect of the invention, a turning toolholder comprises a shank having a main coolant supply hole extending therethrough and a club head at an axially forward end of the shank. The club head has an insert-receiving pocket for receiving a cutting insert. The cutting insert has a top rake surface and one or more side flank surfaces. The club head includes a clamp coolant supply hole in fluid communication with the main coolant supply hole and a flank coolant supply hole in fluid communication with the main coolant supply hole. The club head further includes a flank coolant housing with a flank coolant exit opening located below the insert-receiving pocket. An auxiliary rake coolant supply housing is formed on a top surface of the club head. The auxiliary rake coolant supply housing includes an auxiliary rake coolant exit opening. A clamp is arranged on the club head. The clamp includes a forward nose portion with a downward-extending nub and an aperture formed therethrough. The clamp includes a rake coolant supply hole extending from the aperture to a rake coolant exit opening in the forward nose portion of the clamp. A clamp screw is capable of being inserted through the aperture of the clamp and at least partially received in a clamp-securing bore of the club head to bring the clamp into pressing engagement with the cutting insert. The clamp screw includes an internal coolant supply hole for supplying coolant from the main coolant supply hole to the rake coolant supply hole of the clamp. Coolant is supplied from the main coolant supply hole, through the rake coolant supply hole of the clamp, and exits from the rake coolant exit opening in the forward nose portion of the clamp to direct coolant to the top rake surface of the cutting insert. In addition, coolant is supplied from the main coolant supply hole, through the auxiliary coolant supply hole, and exits from the auxiliary rake coolant exit opening formed in the auxiliary rake coolant supply housing to direct additional coolant to the top rake surface of the cutting insert. Further, coolant is supplied from the main coolant supply hole, through the flank coolant supply hole, and exits the flank coolant exit opening to direct coolant to the one or more side flank surfaces of the cutting insert.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "3D printing" or "additive manufacturing" is the construction of a three-dimensional object from a CAD model or a digital 3D model. The term "3D printing" can refer to a variety of processes in which material is deposited, joined or solidified under computer control to create a three-dimensional object, with material being added together, such as liquid molecules or powder grains being fused together, typically layer by layer. In the 1980s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "hole" is defined as an opening through something; a gap; a cavity or an aperture that can have any cross-sectional shape.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 5 is a cross-sectional view of the turning toolholder taken along line 5-5 of FIG. 4;

FIG. 6 is a partial cutaway cross-sectional view of the turning toolholder taken along line 6-6 of FIG. 4;

FIG. 18 is a cross-sectional view of the turning toolholder taken along line 18-18 of FIG. 17;

FIG. 19 is a partial cutaway cross-sectional view of the turning toolholder taken along line 19-19 of FIG. 17.

DETAILED DESCRIPTION OF THE DISCLOSURE

Figure 1:
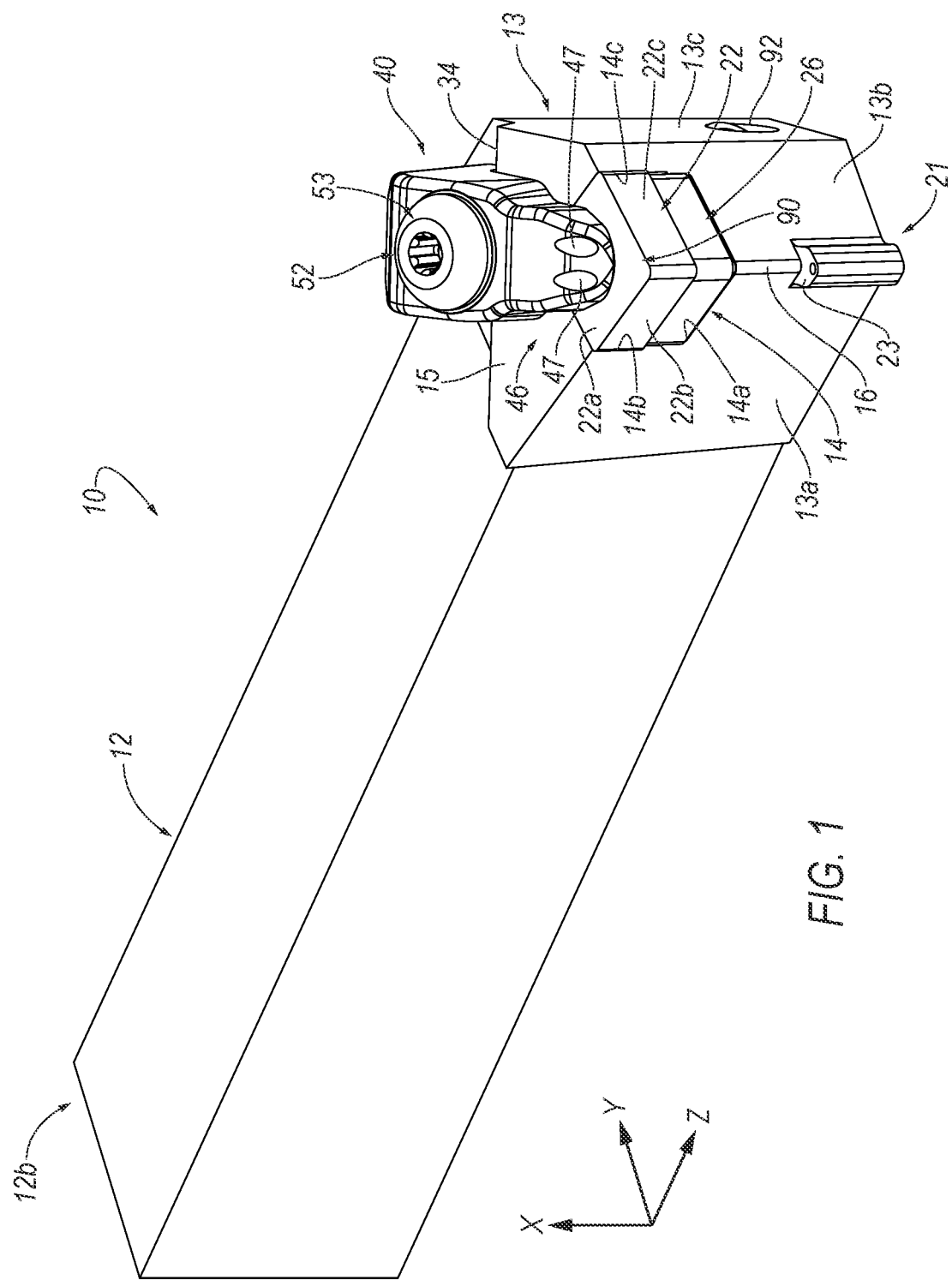
FIG. 1 is a side perspective view of a turning toolholder in accordance with an embodiment of the disclosure.

Referring now to FIGS. 1-7, a turning toolholder 10 is shown according to an embodiment of the disclosure. The turning toolholder 10 comprises a shank 12 with an axially forward end 12a, an axially rearward end 12b and a central, longitudinal axis, $C_L$, and a club head 13 extending from the axially forward end 12a of the shank 12 and having an insert-receiving pocket 14 formed at an outermost corner 16 at the intersection of two side surfaces 13a, 13b of the club head 13. In the illustrated embodiment, the shank 12 and the club head 13 are integrally formed and can be made of tool steel, and the like. The insert-receiving pocket 14 has a bottom surface 14a and a pair of side walls 14b, 14c. The insert-receiving pocket 14 is formed in a top surface 15 of the club head 13.

In one aspect, the toolholder 10 of the disclosure supplies an enhanced flow of coolant to the cutting zone of a cutting insert. To accomplish this, the shank 12 includes a main coolant hole 18 (shown in phantom in FIG. 2) in fluid communication with a source of pressurized coolant (not shown) for supplying coolant to the club head 13 of the toolholder 10. In the illustrated embodiment, the main coolant hole 18 is substantially concentric with the central, longitudinal axis, $C_L$, of the shank 12. In addition, the main coolant hole 18 extends almost entirely through the shank 12 from the axially rearward end 21b of the shank 12 to an axially forward end 12a of the shank 12. As a result of the main coolant hole 18 extending almost entirely through the shank 12, the toolholder 10 of the disclosure may be considered as a "through coolant" type of toolholder.

In the illustrated embodiment, the main coolant hole 18 extends to an optional intermediate coolant hole 20 (shown in phantom in FIGS. 4 and 5) located at the axially forward end 12a of the shank 12. The intermediate coolant hole 20 can be formed by milling a hole into a side surface 13c of the club head 13, and then sealing the hole with a sealing member 92 (FIG. 1), such as a plug, and the like. In an alternate embodiment, the optional intermediate coolant hole 20 can be omitted, and the main coolant hole 18 can extend entirely through the shank 12 and into the club head 13 of the toolholder 10.

Figure 3:
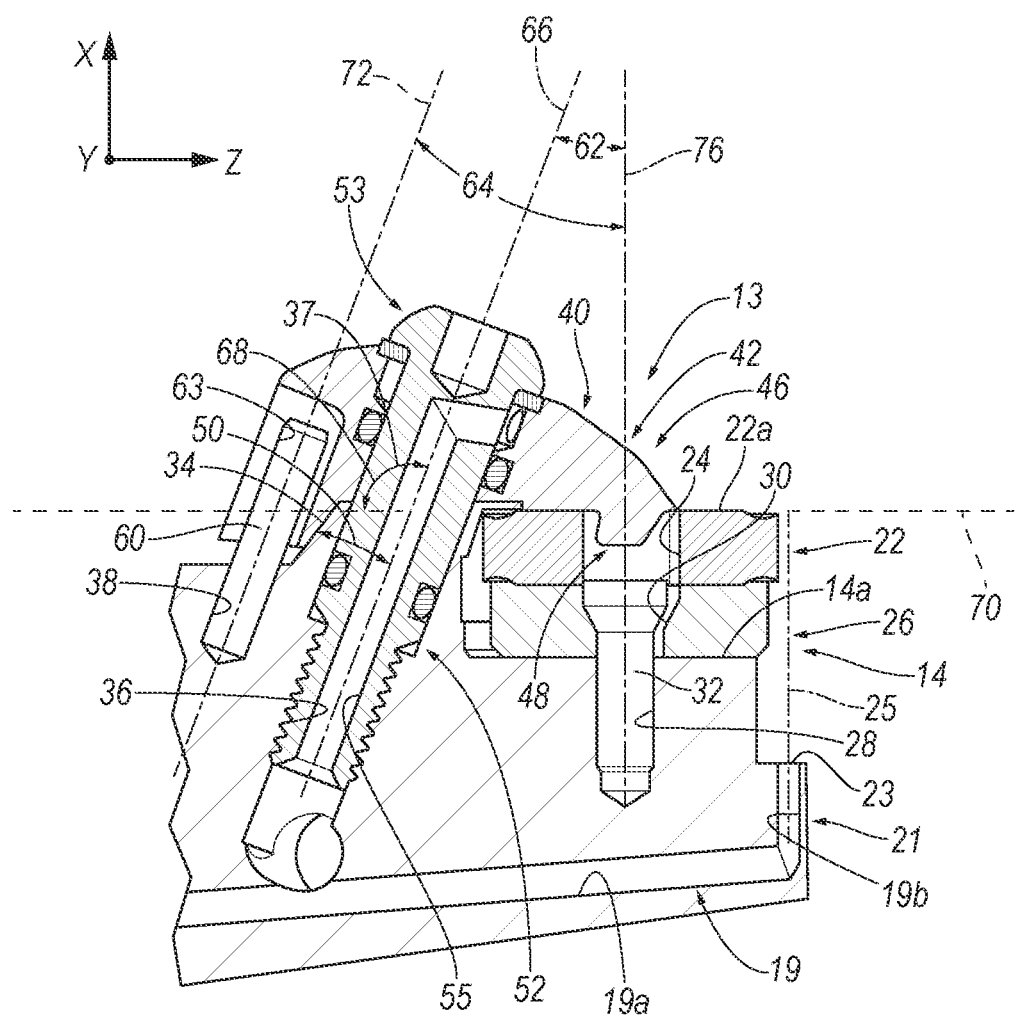
FIG. 3 is a partial cutaway cross-sectional view of the turning toolholder in a clamped position taken along line 3-3 of FIG. 2.
Figure 7:
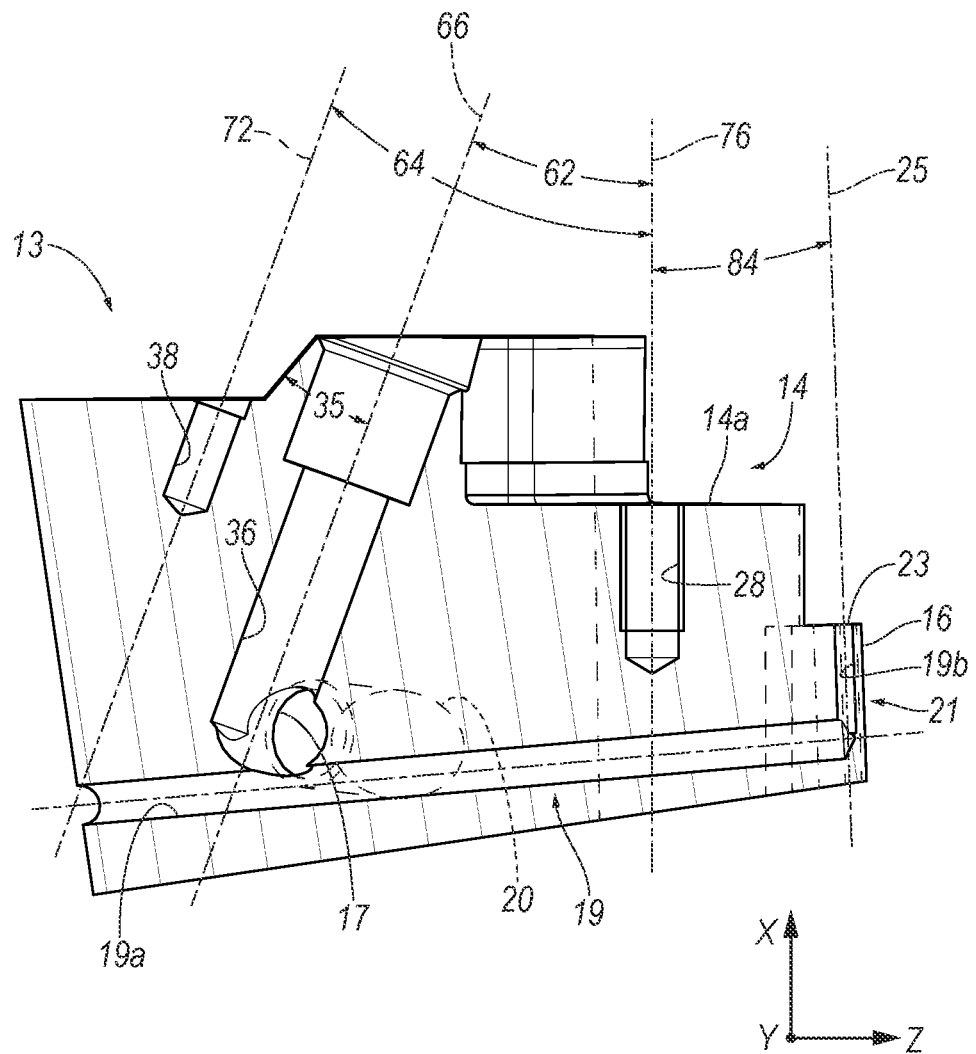
FIG. 7 is a partial cutaway cross-sectional view of the turning toolholder taken along line 7-7 of FIG. 4.

In the illustrated embodiment, the optional intermediate coolant hole 20 is in fluid communication with the main coolant hole 18 and extends from the axially forward end 12a of the shank and partially into the club head 13. The club head 13 includes a clamp coolant supply hole 17 in fluid communication with the main coolant supply hole 18, and a flank coolant supply hole 19 in fluid communication with the main coolant supply hole 18. As shown in FIGS. 3 and 7, the flank coolant supply hole 19 is disposed within a flank coolant supply housing 21 extending from the outermost corner 16 of the club head 13. The flank coolant supply hole 19 has a first flank coolant supply section 19a extending in a horizontal direction from the optional intermediate coolant supply hole 20 (or the main coolant supply hole 18 in the case the intermediate coolant supply hole 20 is omitted. The flank coolant supply hole 19 also has a second flank coolant supply section 19b with a central axis 25 extending from the first flank coolant supply section 19a in a vertical direction to a flank coolant exit opening 23 located below the insert-receiving pocket 14. It should be appreciated that the invention is not limited by the cross-sectional shape of the flank coolant exit opening 23, and that the invention can be practiced with the flank coolant exit opening 23 having any desired cross-sectional shape, such as circular, oval, square, rectangular, triangular, D-shape, V-shape, and the like.

As seen in FIG. 7, the central axis 25 of the second flank coolant supply section 19b is not parallel to the central axis 76 of the internally threaded bore 28 formed in the bottom surface 14c of the insert-receiving pocket 14, but can be formed at an angle 84 of between about 1 degree and about 20 degrees with respect to the central axis 76 of the internally threaded bore 28. In one embodiment, the angle 84 is between about 10 degrees and about 15 degrees with respect to the central axis 76 of the internally threaded bore 28. The central axis 25 of the second section 19b of the flank coolant supply hole 19 being non-parallel to the central axis 76 of the internally threaded bore 28 provides for enhanced delivery of coolant to the side (i.e., flank) surfaces 22b, 22c of the cutting insert 22, thereby reducing wear of the side surfaces 22b, 22c of the cutting insert 22 during a machining operation.

As shown in FIGS. 3 and 7, a cutting insert 22 having a mounting bore 24 formed therethrough is disposed on an optional seat member 26. It will be appreciated that the invention is not limited by the type and shape of the insert 22, and that the invention can be practiced with any desirable shape and type of insert. For example, when the insert 22 is triangular in shape, rather than square or rectangular, the receiving pocket 14 can also be triangular in shape to accommodate the shape of the insert 22. Although the cutting insert 22 can be any shape, the illustrated insert 22 is generally diamond in shape having a top rake surface 22a and at least two side flank surfaces 22b, 22c. It should be understood that two side flank surfaces 22b, 22c contact two of the side walls 14b, 14c of the insert-receiving pocket 14 when the cutting insert 22 is properly mounted in the pocket 14. As a result, three-point contact exists (bottom surface and two flank surfaces of the insert 22 contact the optional seat member 26 or the bottom surface 14a and the two side walls 14b, 14c of the pocket 14) when the cutting insert 22 is properly mounted within the pocket 14.

Figure 4:
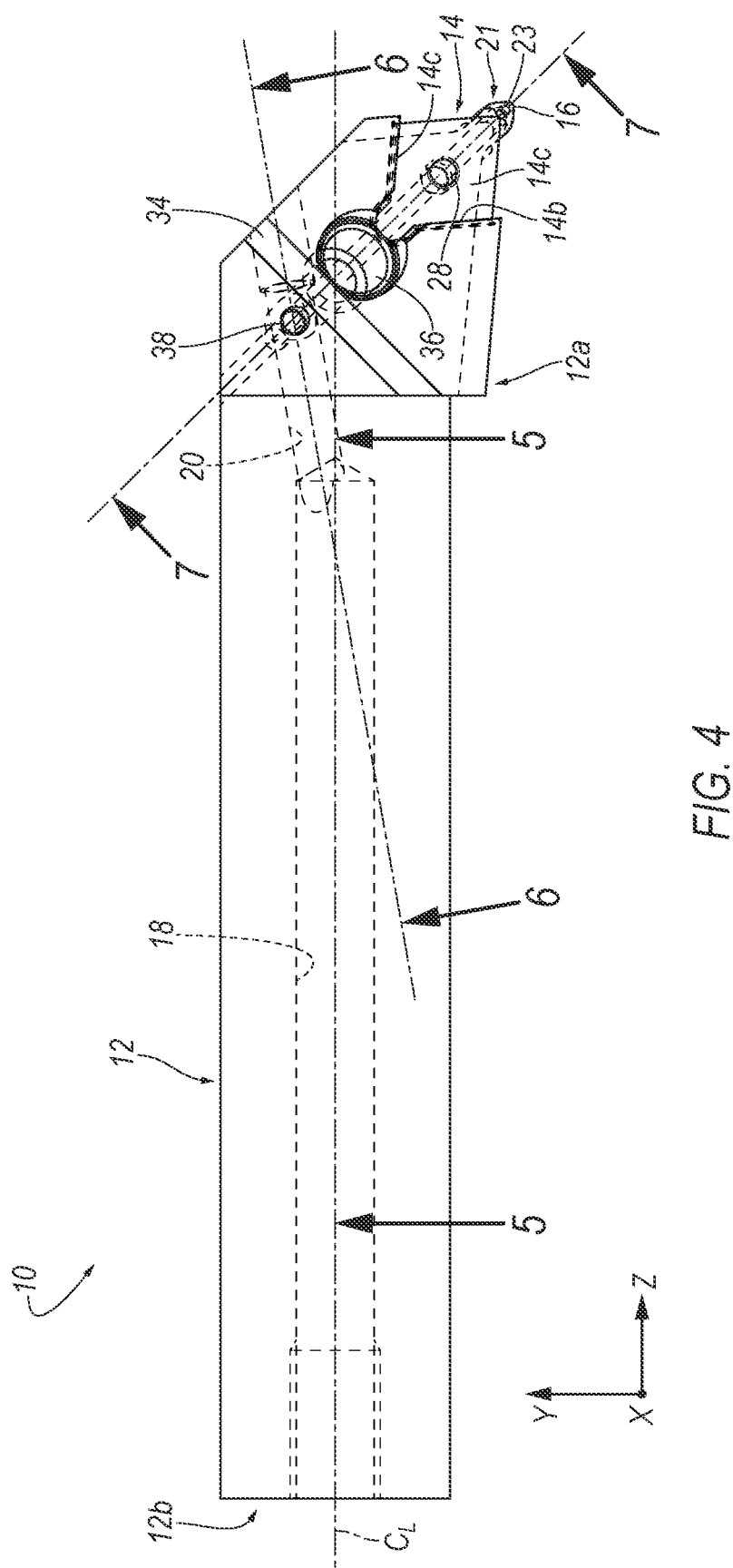
FIG. 4 is another top view of the turning toolholder with the cutting insert, seat member, clamp and guide pin omitted for clarity.

As shown in FIGS. 3 and 4, an internally threaded bore 28 is formed in the bottom surface 14a of the insert-receiving pocket 14, and a bore 30 having an upper portion tapering downward is formed through the seat member 26. The seat member 26 is fixedly secured to the insert-receiving pocket 14 by means of a countersunk screw 32 inserted through the bore 30 and screwed into the threaded bore 28. In an alternative embodiment, the insert 22 can be disposed on the bottom surface 18 of the pocket 14 without the use of the seat member 26 and the head screw 32. In this alternative embodiment, it is not necessary to include the threaded bore 28 in the shank 12.

Figure 2:
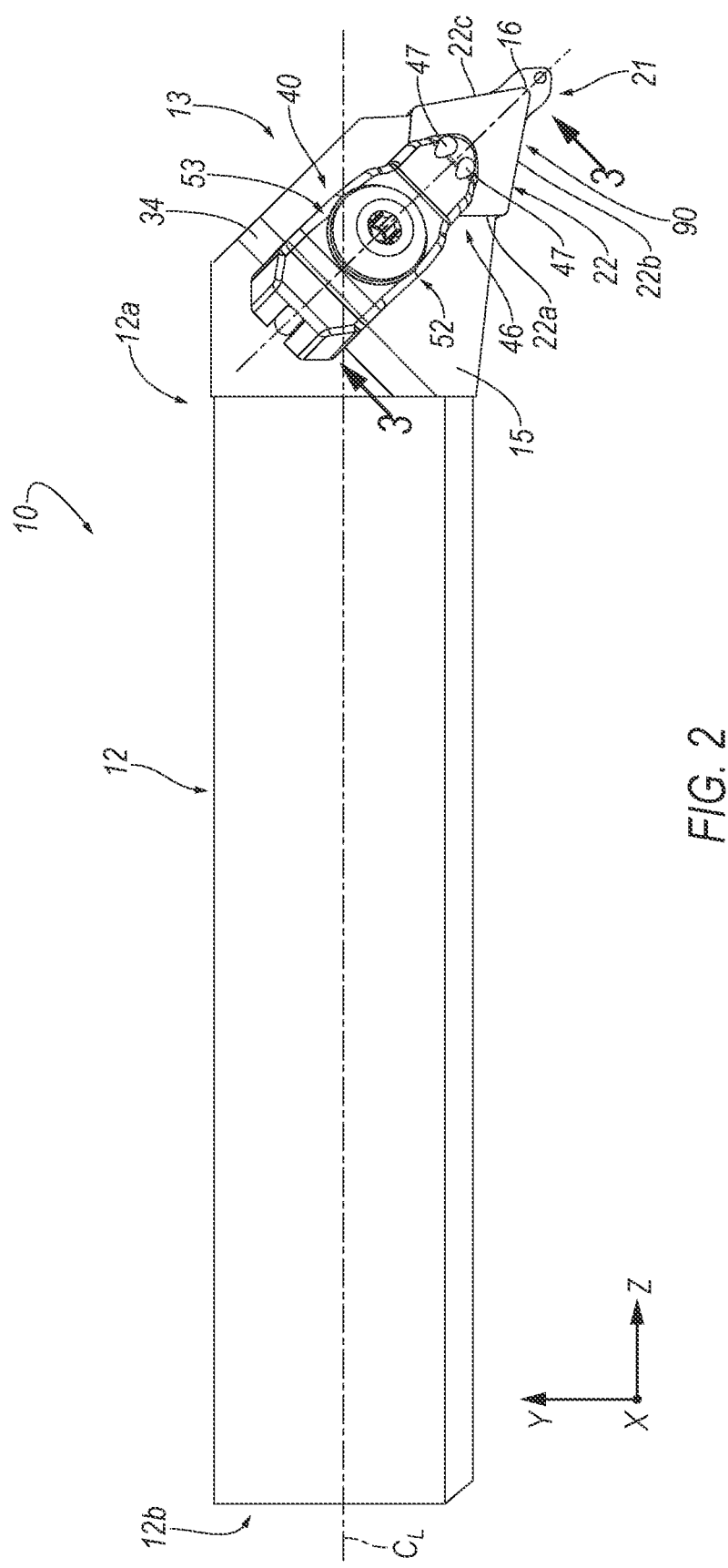
FIG. 2 is a top view of the turning toolholder of FIG. 1.

As seen in FIGS. 2-4, an inclined surface 34 sloping inwardly in a direction away from the insert-receiving pocket 14 is formed on that portion of the upper surface 16 of the club head 13 that is displaced rearwardly with respect to the pocket 14. An internally threaded clamp-securing bore 36 is formed in the tool holder 10 and is located between the inclined surface 34 and the insert-receiving pocket 14. The inclined surface 34 is formed at a prescribed angle 35 with respect to a central axis 66 of the clamp-securing bore 36. In an embodiment, the angle 35 is about 24 degrees. In this embodiment, the central axis 66 of the clamp-securing bore 36 forms an angle 68 that is not perpendicular to a plane 70 defined by the top rake surface 22a of the cutting insert 22.

The toolholder 10 further includes a pin-receiving bore 38 formed in the club head 13 of the toolholder 10. A clamp 40 is arranged on the top surface 16 of the club head 13. The pin-receiving bore 38 maintains alignment of the clamp 40 and the club head 13 as the clamp 40 presses downward and rearward on the cutting insert 22. In the illustrated embodiment, the inclined surface 34 is located between a pin-receiving bore 38 and the clamp-securing bore 36. Alternatively, the pin-receiving bore 38 can be located between the inclined surface 34 and the clamp-securing bore 36. In this embodiment, a central axis 72 of the pin-receiving bore 38 is substantially parallel with the central axis 66 of the clamp-securing bore 36. Thus, the central axis 72 of the pin-receiving bore 38 forms an angle 68 that is not perpendicular to a plane 70 of the body 12, as shown in FIG. 4.

Figure 8:
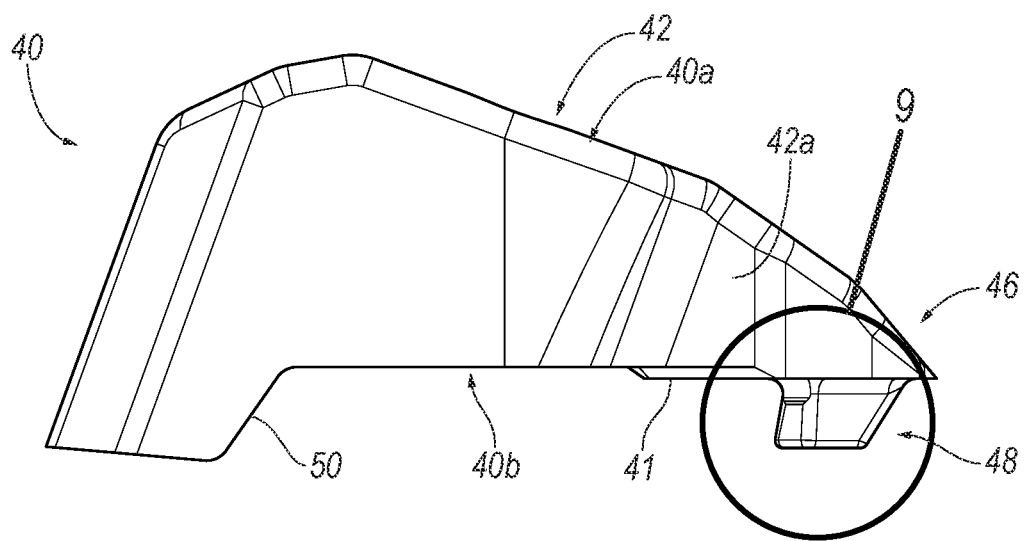
FIG. 8 is a side view of a clamp of the toolholder of the disclosure.
Figure 9:
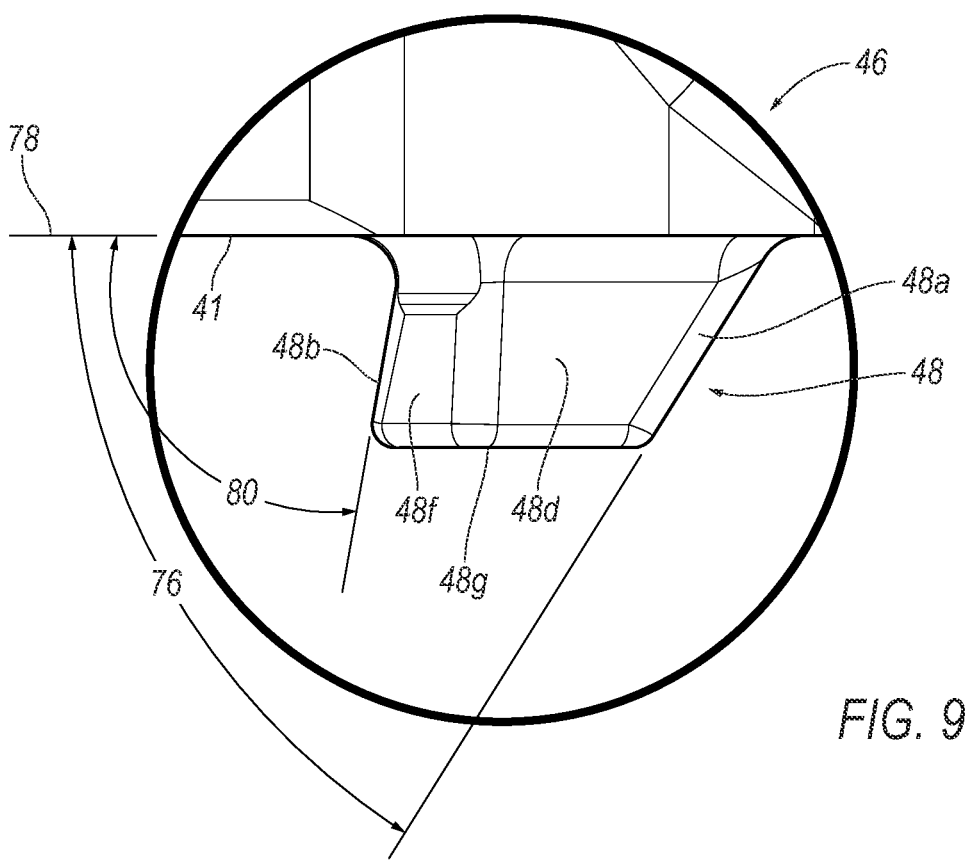
FIG. 9 is an enlarged side view of the nose portion and a nub of the clamp of FIG. 8.
Figure 10:
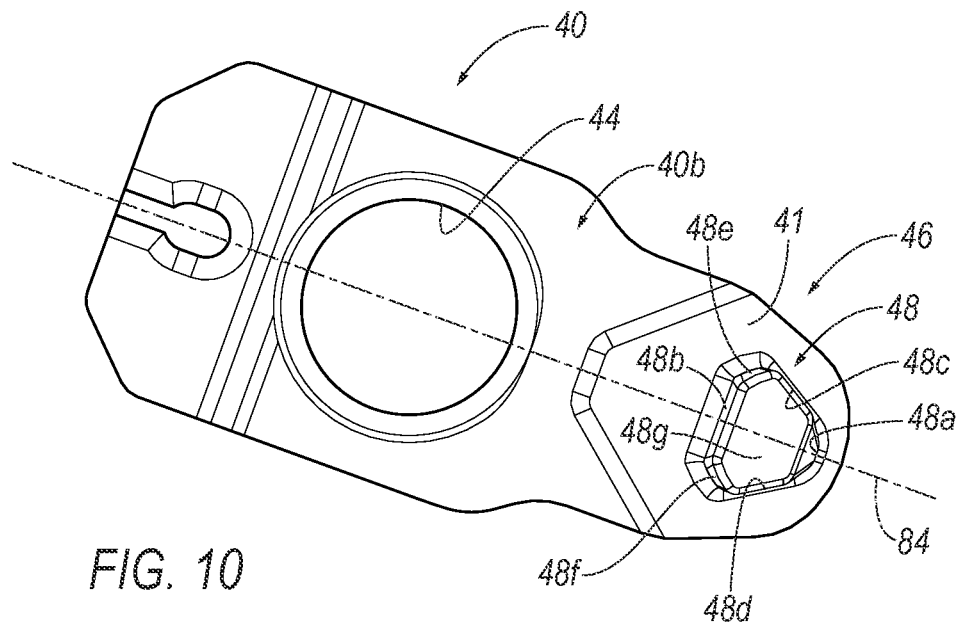
FIG. 10 is a bottom view of the clamp of FIG. 8.
Figure 11:
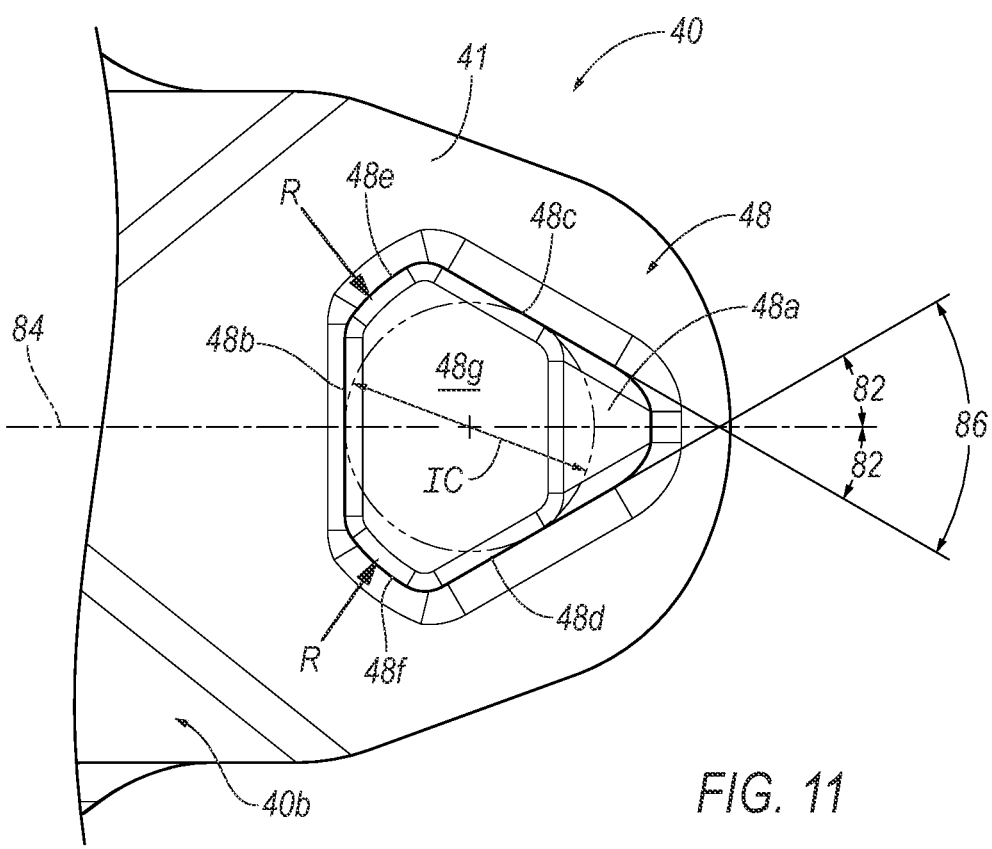
FIG. 11 is an enlarged bottom view of the nub of the clamp of FIG. 10.
Figure 12:
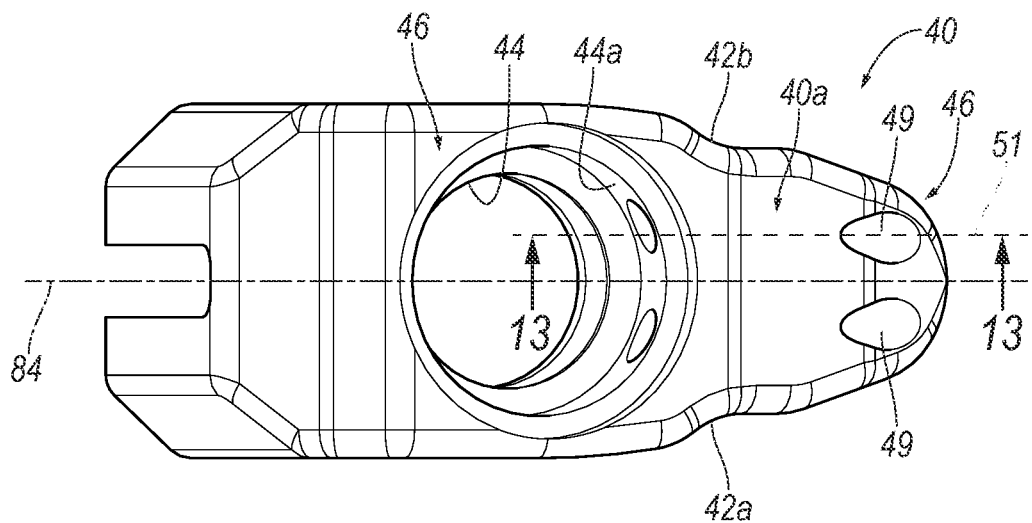
FIG. 12 is an enlarged isomeric top view of the clamp of FIG. 8.

As shown in FIGS. 8-13, a clamp 40 is arranged on the upper surface 16 of the club head 13. In general, the clamp 40 is C-shape in side elevation having a tapered forward portion 42 and tapered side portions 42a, 42b to provide a low profile design. The low profile design reduces the front projection of the clamp 40 and facilitates the removal of chips during the cutting process. As shown in FIGS. 10 and 12, a generally circular aperture 44 is formed in the center of the clamp 40. An annular coolant trough 44a is formed in the circular aperture 44 that acts as a header for supplying coolant to the clamp 40. Alternatively, the aperture 44 and the coolant trough 44a can be non-circular or oblong-shaped having a greater dimension along the longitudinal axis of the club head 13, so long as a sufficient seal of the clamp screw 52 can be achieved. Referring back to FIG. 3, the aperture 44 is formed so that its central axis is substantially concentric with the central axis 66 of the clamp-securing bore 36 of the club head 13. The clamp 40 also includes a substantially planar top surface portion 40a and a substantially planar bottom surface portion 40b.

As shown in FIGS. 8 and 9, the forward end 42 of the clamp 40 also includes and a substantially planar contact pad 41 extending outward (i.e., in a downward direction when the clamp 40 is viewed in side elevation) from the lower surface portion 40b that acts as a seating surface for engaging the top surface 22a of the insert 22 when the toolholder 10 is placed in the clamped position. Because the bottom surface 40b of the clamp 40 is formed to be higher in elevation than the contact pad 41, the bottom surface 40b does not engage the insert 22 when the contact pad 41 is brought into engagement with the top rake surface 22a of the insert 22.

Referring to FIG. 8, the clamp 40 has an inclined surface 50 formed at a proximal end thereof so as to protrude downward and rearward with respect to the clamp-securing bore 36. The inclined surfaces 34, 50 act as ramp surfaces when the tool holder 10 is moved from an unclamped position to a clamped position, and vice versa. However, the inclined surface 50 is formed at an angle 37 with respect to the central axis 66 of the clamp-securing bore 36 that is slightly different than the angle 35 of the inclined surface 34 of the tool holder 10.

It should be noted that the relative angle between the clamp-securing bore 36 and the inclined surfaces 34, 50 can be "tuned" to provide a desired downward force and/or rearward force on the insert 22. In one embodiment, the angle of the clamp-securing bore 36 of the inclined surfaces 34, 50 are approximately 24 degrees with respect to the central axis 66 of the clamp-securing bore 36 to provide slightly more downward force than rearward force on the insert 22. However, it will be appreciated that the relative angle between the clamp-securing bore 36 and the inclined surfaces 34, 50 may be any desired angle to provide the desired ratio of downward to rearward force on the insert 22.

Referring now to FIGS. 8-11, the forward end of clamp 40 includes an arcuate-shaped forward nose portion 46 with a downwardly-extending nub 48 that engages the mounting bore 23 of the insert 22 in a face contact manner when the tool holder 10 is brought into the clamped position. As seen in FIGS. 10 and 11, the nub 48 is surrounded by the contact pad 41 of the clamp 40. In general, the nub 48 has a generally polygonal cross-sectional shape. In the illustrated embodiment, the nub 48 is generally hexagonal in cross-sectional shape with six sides comprising a front wall 48a, a rear wall 48b opposite the front wall 48a, a first angled wall 48c, a second angled wall 48d, a first contact surface 48e and a second contact surface 48f. The nub 48 also has a substantially planar bottom surface 48g.

As seen in FIG. 9, the angled front wall 48a is substantially planar and is formed at an angle 76 with respect to a plane 78 that is substantially parallel to the planar bottom surface 48g of the nub 48 to provide clearance for the nub 48 when inserting the nub 48 into the mounting bore 24 of the insert 22. In one embodiment, for example, that angle 76 is in a range between about 45 degrees and about 75 degrees with respect to the plane 78. In another embodiment, for example, the angle 76 is in a range between about 55 degrees to about 60 degrees. In the illustrated embodiment, the angle 76 is about 58 degrees. However, it will be appreciated that the invention is not limited by the magnitude of the angle 76, and that the invention can be practiced with any desirable angle so long as clearance for the nub 48 is provided.

In addition, the rear wall 48b is substantially planar and formed at an angle 80 with respect to the plane 78. It should be noted that the angle 80 of the rear wall 48b is greater than the angle 76 of the front wall 48a. In one embodiment, for example, that angle 80 is in a range between about 75 degrees and about 85 degrees with respect to the plane 78. In the illustrated embodiment, the angle 80 is about 80 degrees. However, it will be appreciated that the invention is not limited by the magnitude of the angle 80, and that the invention can be practiced with any desirable angle so long as clearance for the nub 48 is provided.

As seen in FIG. 11, the first angled wall 48c is substantially planar and is formed at an angle 82 with respect to a central, longitudinal axis 84 of the clamp 40. In the illustrated embodiment, the nub 40 is mirror symmetric about the central, longitudinal axis 84. Therefore, the second angled wall 48d is substantially planar and is formed at the same angle 82 with respect to the central, longitudinal axis 84 of the clamp 40. In one embodiment, the angle 82 is in a range between about 25 degrees and about 45 degrees. For example, the angle 82 can be about 30 degrees. Thus, the first angled wall 48c is formed at an angle 86 of about 60 degrees (i.e., 2×30 degrees=60 degrees) with respect to the second angled wall 48d. However, it will be appreciated that the invention is not limited by the magnitude of the angle 82, and that the invention can be practiced with any desirable angle so long as clearance for the nub 48 is provided. It should be noted that the rear wall 48b and the first and second angled walls 48c, 48d of the nub 48 are sized so as to contact an inscribed circle, IC, as shown in FIG. 11.

Unlike the first and second angled walls 48c, 48d, the first and second contact surfaces 48e, 48f are formed with a radius, R. As a result, the first and second surfaces 48e, 48f are rounded or arcuate in shape. The purpose of the radius, R, is to provide face contact with the mounting bore 24 of the insert 22, rather than line contact as in conventional clamping devices. To achieve face contact, rather than line contact, between the nub 48 and the mounting bore 24 of the insert 22, the magnitude of the radius, R, is ideally identical to the radius of the mounting bore 24. Thus, the magnitude of the radius, R, depends on the dimensions of the mounting bore 24 of the insert 22. In the illustrated embodiment, for example, the radius, R, is about 2.6 mm (0.10 inches). As a result of face contact between the nub 48 and the mounting bore 24 of the insert 22, the stresses during clamping of the insert 22 are distributed over a larger area of the nub 48, thereby resulting in significantly less stress (Stress=Force/Area) and less deformation, as compared to clamping devices with line contact between the nub and the insert. Finite Element Analysis (FEA) studies have shown that there is about 83.4% reduction in stress between the clamp 40 of the invention providing face contact between the insert and the clamp and a conventional clamp providing line contact between the insert and the clamp.

Referring back to FIG. 3, the central axis 66 of the clamp-securing bore 36 is formed at an angle 62 with respect to a central axis 76 of the nub 48. Similarly, the central axis 72 of the pin-receiving bore 38 is formed at an angle 64 with respect to the central axis 76 of the nub 48. In an embodiment, the angles 62, 64 are approximately 20 degrees that causes the first and second contacts surfaces 48e, 48f of the nub 48 to be in face contact with the rearward inner surface of the mounting bore 24 and exert a force rearward on the insert 22. In addition, the forward lower surface 40b of the clamp 40 engages the top surface 22a of the insert 22 to exert a force downward on the insert 22. Thus, the clamp 40 of the invention provides three-point contact between the insert 22 and the clamp 40 to pull the insert downward and rearward into the pocket 14 of the tool holder 10, as shown in FIG. 3.

Figure 13:
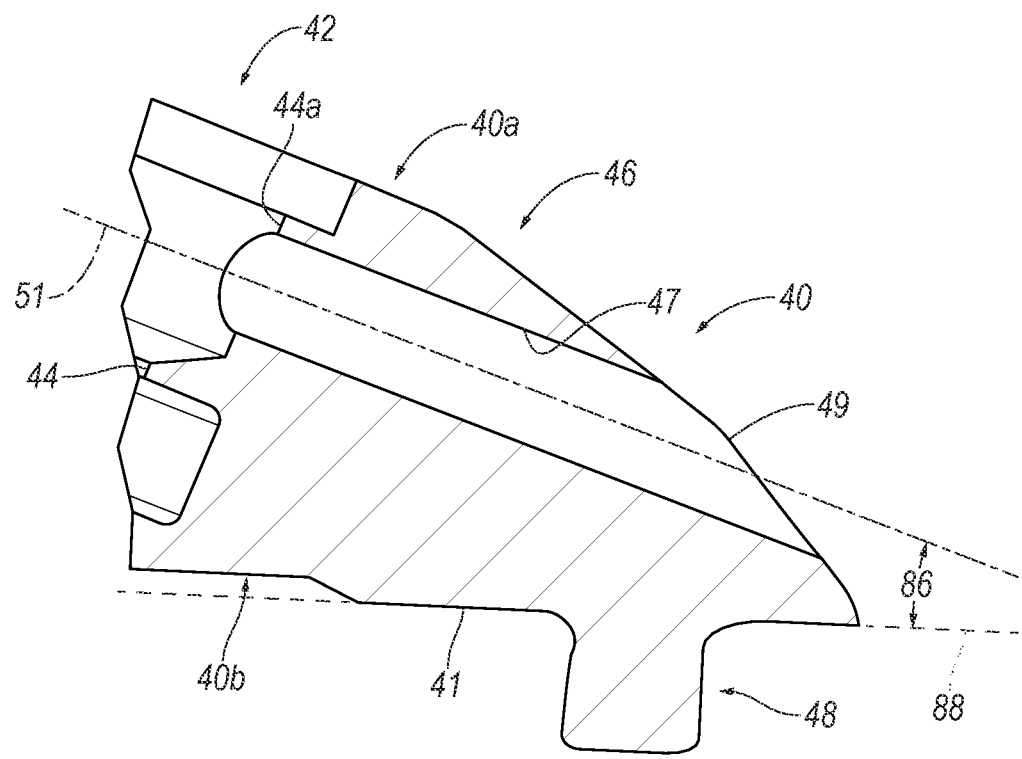
FIG. 13 is a partial cutaway cross-sectional view of the clamp taken along line 13-13 of FIG. 12.

Referring now to FIGS. 12 and 13, the tapered forward portion 42 of the clamp 40 includes one or more rake coolant supply holes 47 in fluid communication with the annular coolant trough 44a. In the illustrated embodiment, the clamp 40 includes two rake coolant supply holes 47 in fluid communication with the annular coolant trough 44a. However, it will be appreciated that the invention is not limited by the number of rake coolant supply holes 47, and that the invention can be practiced with any desirable number of rake coolant holes, for example, one, three, four five, six, and the like. Each rake coolant supply hole 47 has generally a circular cross-sectional area with a central axis 51 and a rake coolant exit opening 49 formed in the forward nose portion 46 of the clamp 40. The central axis 51 can be formed at any angle with respect to the central, longitudinal axis 84. In an alternative embodiment, each rake coolant supply hole 47 can have a cross-sectional area that narrows from the annular coolant trough 44a to the rake coolant exit opening 49. The annular coolant trough 44a, together with the narrowing cross-sectional area of each rake coolant supply hole 47 enables the coolant flow to be homogeneous and concentrated, as compared to conventional clamp designs. As should be appreciated, the central axis 51 of each rake coolant supply hole 47 forms a non-zero angle 86 with respect to a plane 88 defined by the contact pad 41 of the clamp 40. The one or more rake coolant supply holes 47 provide coolant flow in close proximity to a cutting zone 90 (FIGS. 1 and 2) of the cutting insert 22.

Figure 14:
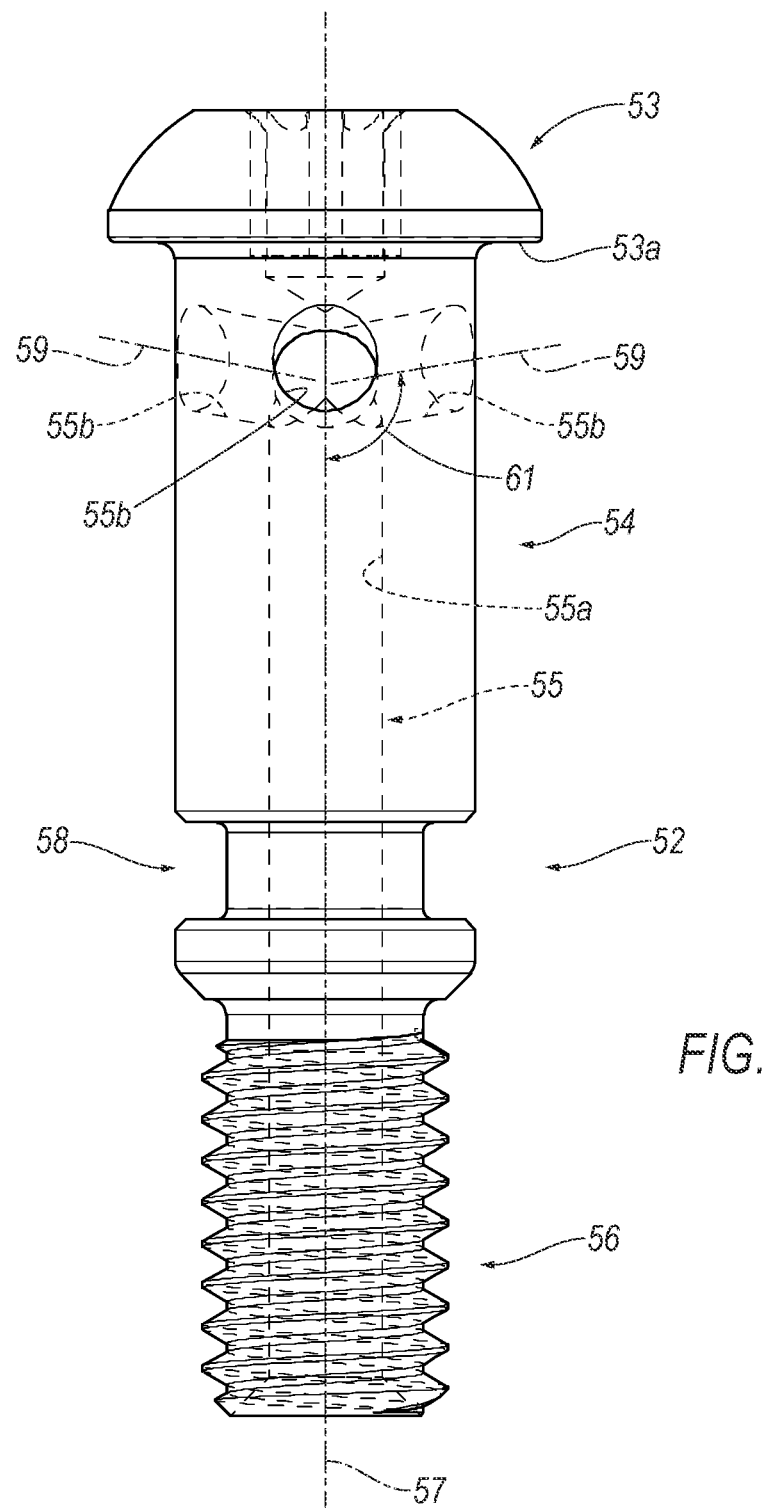
FIG. 14 is a side elevational view of the clamp screw according to an embodiment of the disclosure.
Figure 15:
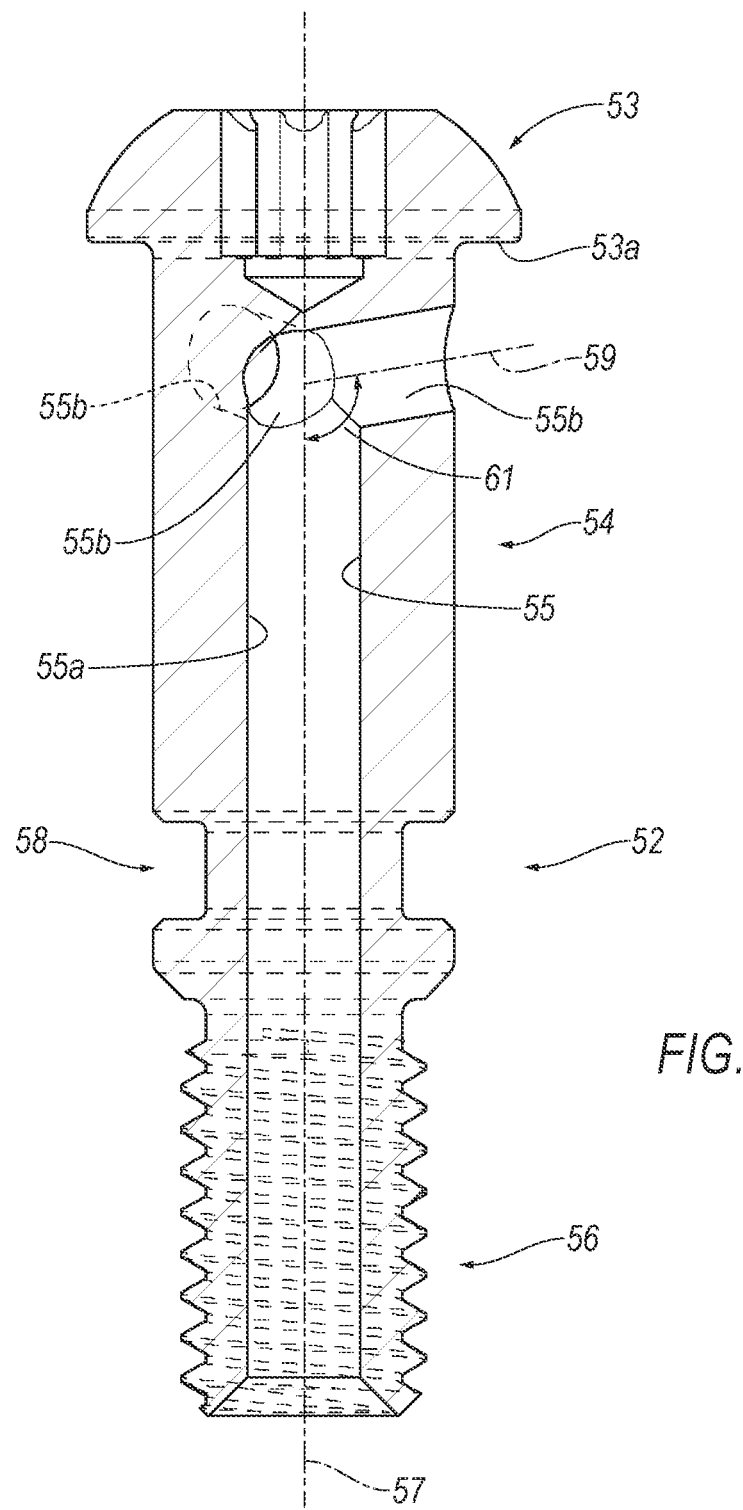
FIG. 15 is a cross-sectional view of the clamp screw of FIG. 14 taken along the central, longitudinal axis.

Referring now to FIGS. 14 and 15, the clamp 40 is secured to the club head 13 by means of a clamp screw 52 having a head portion 53, a non-threaded portion 54 and a threaded portion 56 separated by an annular groove 58 therebetween. The annular groove 58 is capable of receiving a sealing member (not shown) for sealing the clamp screw 52 within the clamp-receiving bore 36. The head portion 53 includes a lower face 53a that is substantially perpendicular to the central axis 66 of the clamp-securing bore 36, as shown in FIG. 3.

In one aspect, the clamp screw 52 includes an internal coolant supply hole 55 in fluid communication with the main coolant supply hole 18 (or the optional intermediate coolant hole 20). The internal coolant supply hole 55 extends entirely through the threaded portion 56 and at least partially into the non-threaded portion 54. In the illustrated embodiment, the internal coolant supply hole 55 has an axially-extending portion 55a that extends along a central, longitudinal axis 57 of the clamp screw 52 and at least three radially-extending portions 55b that extend transverse with the axially-extending portion 55a. Each radially-extending portion 55b has a central axis 59 formed at an angle 61 with respect to the central, longitudinal axis 57 of the clamp screw 52. The angle 61 can be any desired value to increase the flow of coolant through the clamp screw 52. For example, the angle 61 can be 80 degrees, 90 degrees, 110 degrees, and the like. In the illustrated embodiment, each radially-extending portion 55b intersect the axially-extending portion 55a at the same axial elevation, as shown in FIGS. 14 and 15. However, it will be appreciated that one or more radially-extending portions 55b can be located at different axial elevations along the axially-extending portion 55a of the internal coolant supply hole 55. The internal coolant supply hole 55 supplies coolant from the main coolant supply hole 18 to the annular coolant trough 44a of the clamp 40 (FIG. 12), which in turn, supplies coolant to the one or more rake coolant supply holes 47 and through one or more rake coolant exit openings 49 in the forward nose portion 46 of the clamp 40, thereby providing a precise coolant flow in close proximity to the top rake surface 22a and the cutting zone 90 (FIGS. 1 and 2) of the cutting insert 22.

Referring back to FIG. 3, a guide pin 60 is disposed within the pin-receiving bore 38 to prevent the clamp 40 from spinning or twisting in an axial direction (in a direction perpendicular to the direction of travel of the clamp screw 52) when turning of the clamp screw 52 to loosen or tighten the clamp 40. Although the guide pin 60 can be formed of a solid pin, the guide pin 60 can be in the form of a slotted spring pin that can flex, expand or compress to allow for variations in design and wear of the toolholder 10. The guide pin 60 can be press fit into the pin-receiving bore 38 of the club head 13. The length of the guide pin 60 is selected to allow the clamp 40 to move away from the insert 22 while preventing the clamp 40 from spinning or twisting in the axial direction.

It will be appreciated that the diameter of the pin-receiving bore 38 can be slightly smaller than the diameter of the guide pin 60 to allow the guide pin 60 to be press fit within the pin-receiving bore 38. It will be appreciated that the pin-receiving bore 38 and the guide pin 60 can be eliminated by forming the inclined surfaces 34, 50 with convex, concave or contour complementary shaped surfaces. Oppositely, the inclined surfaces 34, 50 can be eliminated and made integral with the guide pin 60 or attached as a separate component when retrofitting a conventional toolholder.

As described above, the the shank 12 and the club head 13 of the toolholder 10 are integrally formed of tool steel using conventional methods. However, it will be appreciated that the invention is not limited by the shank 12 and the club head 13 of the earlier embodiment, and that the principles of the invention can be practiced with a toolholder 100 with the head club 130 manufactured by additive manufacturing (i.e., 3D printing), rather than integrally formed with the shank 12, as shown in FIGS. 16-20. The club head 130 can be made of the same material as the shank 12 (i.e., tool steel), or can be made of a different, suitable material, if desired.

Figure 17:
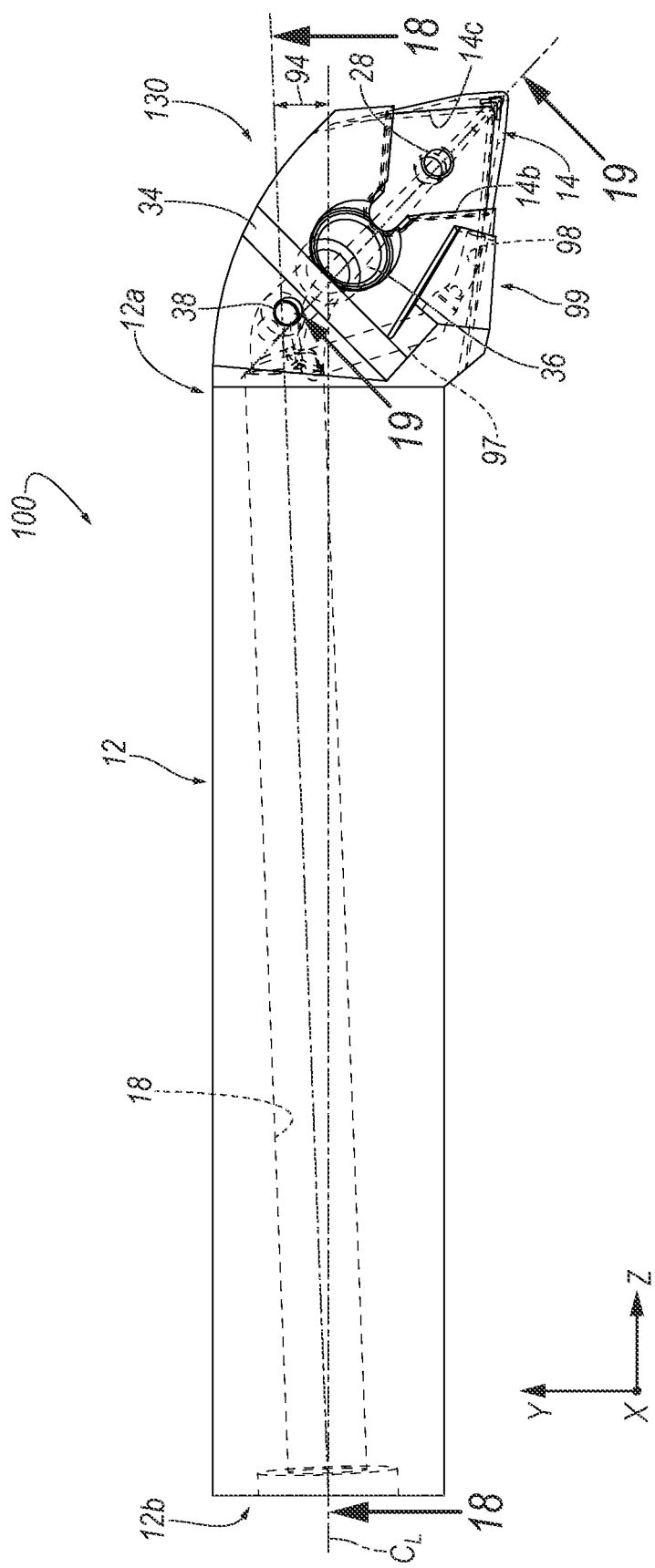
FIG. 17 is a top view of the turning toolholder of FIG. 16 with the cutting insert, seat member, clamp and guide pin omitted for clarity.

The toolholder 100 includes the main coolant supply hole 18 extending entirely through the shank 12 from the axially rearward end 12b to the axially forward end 12a. The main coolant supply hole 18 can be formed by drilling a hole entirely through the shank 12. It is noted that, in this embodiment, the optional intermediate coolant hole 20 is omitted. Unlike the main coolant hole 18 of the earlier embodiment that is substantially parallel to the central, longitudinal axis, $C_L$, of the shank 12 (i.e., formed at a substantially zero angle), the main coolant hole 18 of the toolholder 100 is formed at a non-zero angle 94 with respect to the central, longitudinal axis, $C_L$, of the shank 12 (i.e., along the z-axis) when viewed in the top view, as shown in FIG. 17. In addition, the main coolant hole 18 of the toolholder 100 is formed at a non-zero angle 96 with respect to the central, longitudinal axis, $C_L$, of the shank 12 when viewed in a side view, as shown in FIG. 18. Specifically, the main coolant hole 18 slopes downward from the axially rearward end 12b to the axially forward end 12a of the shank 12 when viewed in a side view, as shown in FIG. 18. Studies have shown that the downward angle 96 enhances the flow of coolant to the club head 130, as compared to the main coolant supply hole 18 that is substantially parallel to the central, longitudinal axis, $C_L$, of the earlier embodiment.

Figure 16:
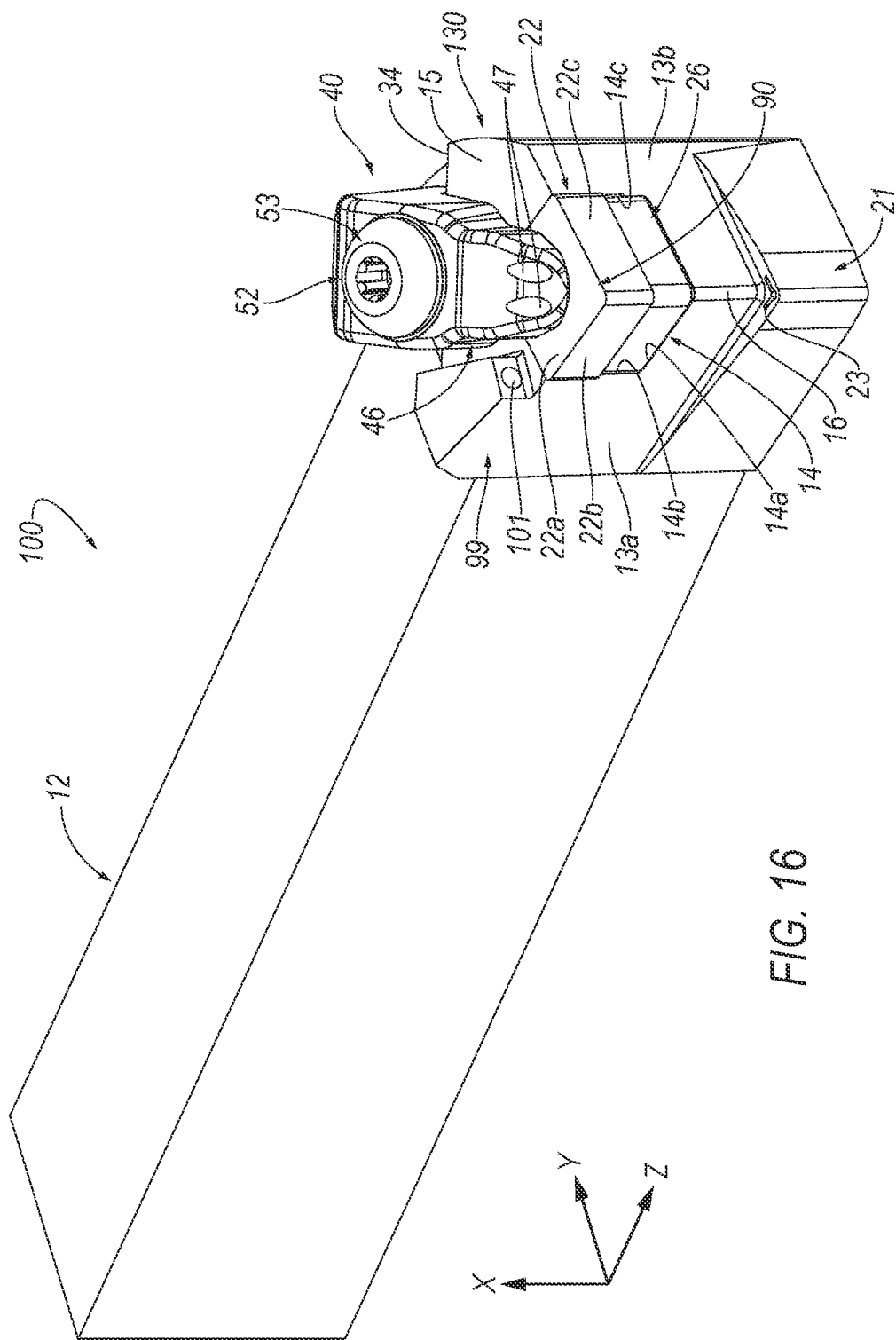
FIG. 16 is a side perspective view of a hybrid turning toolholder in accordance with a club head formed by additive manufacturing according to an embodiment of the disclosure.

Similar to the earlier embodiment, the club head 130 includes a flank coolant supply hole 19 in fluid communication with main coolant hole 180 for supplying coolant to a flank coolant exit opening 23 formed in a flank coolant supply housing 21 extending from the outermost corner 16 of the club head 130. Unlike the earlier embodiment, the use of additive manufacturing easily enables the cross-sectional area of the flank coolant supply hole 19 to continuously narrow from the main coolant hole 18 toward the outermost corner 16 of the club head 13, as shown FIG. 19. This continuously narrowing of the cross-sectional area of the flank coolant supply hole 19 ensures laminar flow and minimum cross-sectional area proximate the flank coolant exit opening 23, thereby providing superior cooling performance of the flank side surfaces 22b, 22c of the cutting insert 22. In addition, the flank coolant exit opening 23 is V-shaped to provide a fan-like coolant pattern to the side flank surfaces 22b, 22c of the cutting insert 22 (FIG. 16). It has been found that the V-shaped flank coolant exit opening 23 provides superior cooling in applications requiring high depth of cut.

In another aspect, the club head 130 includes an auxiliary rake coolant supply hole 97 in fluid communication with the main coolant hole 18, as shown in phantom in FIG. 17. The auxiliary rake coolant supply hole 97 provides coolant to an auxiliary rake coolant hole 98 formed in an auxiliary rake coolant supply housing 99 formed on the top surface 15 of the club head 130. The use of additive manufacturing easily enables the formation of the auxiliary rake coolant supply hole 97, the auxiliary rake coolant hole 98 and the auxiliary rake coolant supply housing 99 on the top surface 15 of the club head 130. The auxiliary rake coolant hole 98 has an auxiliary rake coolant exit opening 101 that directs additional coolant to the top rake surface 22a of the cutting insert 22 and is particularly useful during high heat applications.

Figure 20:
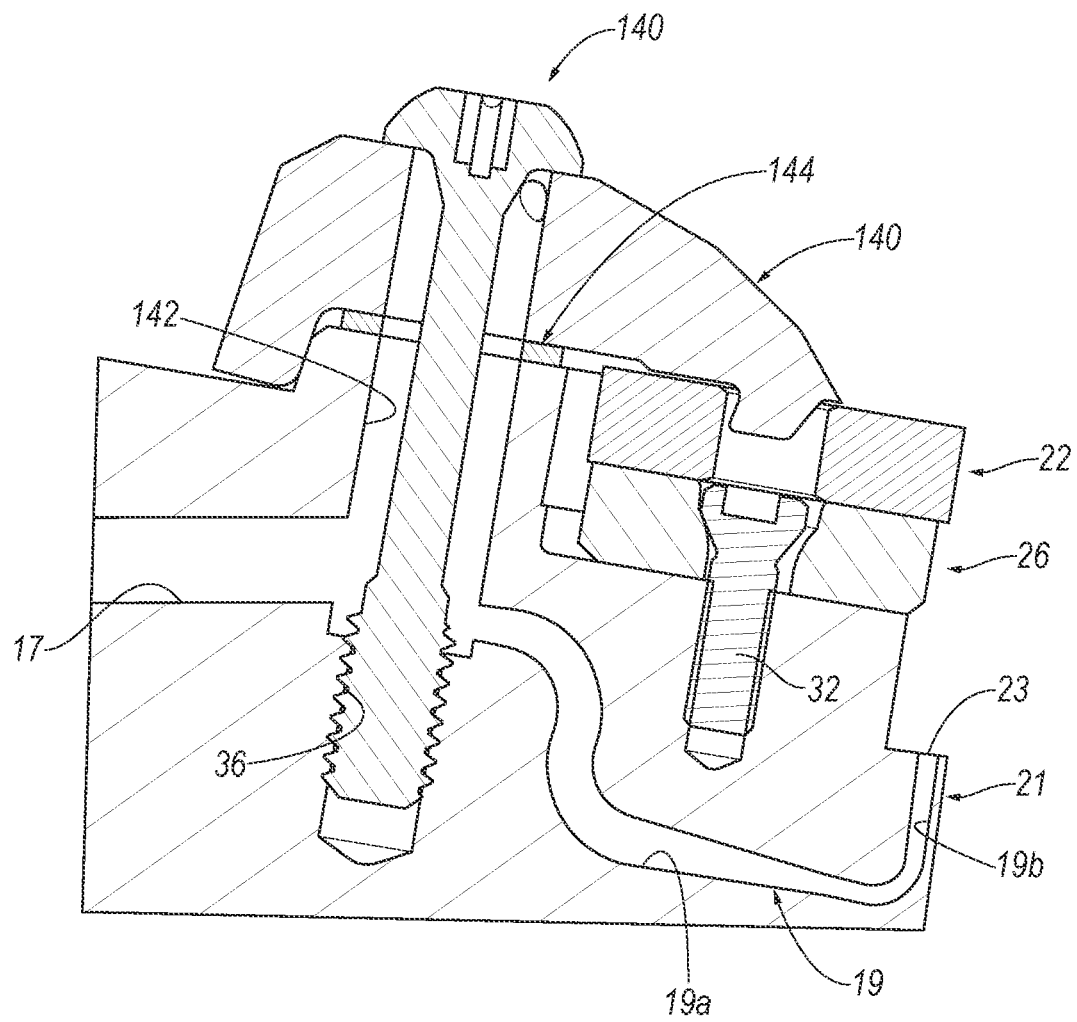
FIG. 20 is a partial cutaway cross-sectional view of the turning toolholder taken along line 19-19 of FIG. 17.

In the earlier embodiment, the clamp screw 52 is conventionally manufactured and includes an internal coolant hole 55 for supplying coolant to the clamp 40. However, the use of additive manufacturing enables an alternate design for the clamp screw 52. As shown in FIG. 20, a clamp screw 140 has a solid construction and the coolant is supplied to the clamp 40 by an annular coolant channel 142 surrounding the clamp screw 140. In this embodiment, the flank coolant supply hole 19 is in fluid communication with the clamp-securing bore 36, which also acts as the annular coolant channel 142 surrounding the clamp screw 140. This embodiment also includes a sealing member 144, such as an O-ring, and the like, to seal the clamp 40 from the coolant supply.

The patents and publications referred to herein are hereby incorporated by reference.

Having described presently preferred embodiments the invention may be otherwise embodied within the scope of the appended claims.

What is claimed is:

1. A turning toolholder, comprising:
 a shank having a main coolant supply hole extending therethrough;
 a club head at an axially forward end of the shank, the club head having an insert-receiving pocket for receiving a cutting insert, the cutting insert having a top rake surface and one or more side flank surfaces, the club head including a clamp coolant supply hole in fluid communication with the main coolant supply hole and a flank coolant supply hole in fluid communication with the main coolant supply hole, and a flank coolant housing monolithic with the club head and having a flank coolant exit opening protruding axially outward from a front surface of the club head and located below the insert-receiving pocket;

a clamp arranged on the club head, the clamp including a forward nose portion with a downward-extending nub, the clamp including an aperture formed therethrough, the clamp including a rake coolant supply hole extending from the aperture to a rake coolant exit opening in the forward nose portion of the clamp; and a clamp screw capable of being inserted through the aperture of the clamp and at least partially received in a clamp-securing bore of the club head to bring the clamp into pressing engagement with the cutting insert, the clamp screw having a head portion, a non-threaded portion, a threaded portion and an annular groove disposed between the non-threaded portion and the threaded portion, the annular groove capable of receiving a sealing member for sealing the clamp screw within the clamp-securing bore, the clamp screw having a central, longitudinal axis and including an internal coolant supply hole in fluid communication with both the main coolant supply hole and the clamp coolant supply hole of the club head for providing coolant to the clamp, the internal coolant supply hole having an axially-extending portion extending along the central, longitudinal axis of the clamp screw and a plurality of radially-extending portions, each radially-extending portion in fluid communication with the axially-extending portion and having a central axis that extends at an angle with respect to the central, longitudinal axis of the clamp screw, wherein coolant is supplied from the main coolant supply hole, through the internal coolant supply hole of the clamp screw, through the rake coolant supply hole of the clamp, and exits from the rake coolant exit opening in the forward nose portion of the clamp to direct coolant to the top rake surface of the cutting insert, wherein coolant is supplied from the main coolant supply hole, through the flank coolant supply hole, and exits the flank coolant exit opening to direct coolant to the side flank surface of the cutting insert, and wherein the flank coolant exit opening directs coolant at an angle with respect to a central axis of an internally threaded bore formed in a bottom surface of the insert-receiving pocket of the club head.

2. The turning toolholder of claim 1, wherein the flank coolant exit opening is V-shaped.

3. The turning toolholder of claim 1, wherein the flank coolant supply hole continuously decreases in diameter from the main coolant supply hole to the flank coolant supply exit, thereby maintaining laminar flow and increasing a velocity of the coolant supplied to the side flank surface of the cutting insert.

4. The turning toolholder of claim 1, wherein the club head further comprises a top surface with a rake coolant housing having an auxiliary rake coolant supply hole in fluid communication with the main coolant supply hole for directing coolant, and wherein the auxiliary rake coolant supply hole has an auxiliary rake coolant supply exit for supplying coolant to the top rake surface of the cutting insert.

5. The turning toolholder of claim 1, wherein the aperture of the clamp includes an annular coolant trough for receiving coolant from the main coolant supply hole and for providing coolant to the rake coolant supply hole.

6. The turning toolholder of claim 1, wherein coolant supplied from the main coolant hole to the clamp screw is received in an annular coolant channel surrounding the clamp screw.

7. The turning toolholder of claim 1, wherein the nub is polygonal in cross-sectional shape comprising a first contact surface and a second contact surface, and wherein the first contact surface and the second contact surface of the nub are formed with a radius, R, that is approximately equal to a radius of a mounting bore of the cutting insert, thereby providing face contact between the mounting bore of the insert and the clamp when the clamp is brought into pressing engagement with the insert.

8. The turning toolholder according to claim 7, wherein the nub is hexagonal in cross-sectional shape further comprising a front wall, a rear wall opposite the front wall, a first angled wall, and a second angled wall.

9. The turning toolholder according to claim 8, wherein the front wall is formed at an angle with respect to a plane that is substantially parallel to a bottom surface of the nub for providing clearance for the nub when inserting the nub into the mounting bore of the insert.

10. The turning toolholder according to claim 1, further comprising an auxiliary rake coolant supply hole formed in the club head and in fluid communication with the main coolant supply hole.

11. The turning toolholder according to claim 10, wherein the club head further includes an auxiliary rake coolant supply housing formed on a top surface of the club head, the auxiliary rake coolant supply housing including an auxiliary rake coolant exit opening to direct additional coolant to the top rake surface of the cutting insert.

12. The turning toolholder of claim 1, wherein the turning toolholder comprises a hybrid turning toolholder in which the club head is manufactured by additive manufacturing.

13. The turning toolholder of claim 1, wherein the clamp is C-shape in side elevation having a tapered forward portion and tapered side portions to provide a low profile design to facilitate in chip evacuation.

14. The turning toolholder of claim 1, wherein the flank coolant supply hole has a first flank coolant supply section extending in a first direction and a second flank coolant supply section with a central axis extending from the first flank coolant supply section in a different, second direction than the first direction.

15. The turning toolholder of claim 14, wherein the central axis of the second flank coolant supply section is formed at an angle with respect to the central axis of the internally threaded bore formed in the bottom surface of the insert-receiving pocket of the club head.

16. The turning toolholder of claim 15, wherein the angle with respect to the central axis of the internally threaded bore formed in the bottom surface of the insert-receiving pocket is between 1 degree and 20 degrees.

* * * * *